United States Patent
Yang et al.

(10) Patent No.: US 11,707,876 B2
(45) Date of Patent: Jul. 25, 2023

(54) POLYESTER FILM AND METHOD FOR PRODUCING THE SAME

(71) Applicant: NAN YA PLASTICS CORPORATION, Taipei (TW)

(72) Inventors: Wen-Cheng Yang, Taipei (TW); Te-Chao Liao, Taipei (TW); Hao-Sheng Chen, Taipei (TW); Chien-Chih Lin, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 318 days.

(21) Appl. No.: 16/839,452

(22) Filed: Apr. 3, 2020

(65) Prior Publication Data

US 2021/0053267 A1 Feb. 25, 2021

(30) Foreign Application Priority Data

Aug. 20, 2019 (TW) ................................ 108129565

(51) Int. Cl.
  B29C 48/19 (2019.01)
  B29C 48/40 (2019.01)
  (Continued)

(52) U.S. Cl.
  CPC ............... B29C 48/19 (2019.02); B29B 7/14 (2013.01); B29C 48/40 (2019.02); B32B 27/08 (2013.01); B32B 27/20 (2013.01); B32B 27/36 (2013.01); C08J 3/22 (2013.01); *B29K 2067/00* (2013.01); *B29K 2995/004* (2013.01); *B29K 2995/0016* (2013.01); *B29K 2995/0039* (2013.01);
  (Continued)

(58) Field of Classification Search
  CPC ......... B32B 27/08; B32B 27/20; B32B 27/36; B32B 2205/02; B32B 2250/03; B32B 2307/306
  See application file for complete search history.

(56) References Cited

U.S. PATENT DOCUMENTS

| | | | | |
|---|---|---|---|---|
| 4,798,875 A | * | 1/1989 | Itoyama | .................. B29C 55/12 428/910 |
| 2012/0114977 A1 | * | 5/2012 | Mitsuoka | .................. C08J 5/18 428/156 |

(Continued)

FOREIGN PATENT DOCUMENTS

| CN | 1248514 A | 3/2000 | |
|---|---|---|---|
| CN | 1735508 A | 2/2006 | |
| CN | 102459429 A | 5/2012 | |
| CN | 103459497 A | 12/2013 | |
| CN | 110041665 A | 7/2019 | |
| EP | 2716691 * | 4/2018 | ........... C08L 101/00 |
| JP | 9289242 A | 11/1997 | |
| JP | 2004122699 A | 4/2004 | |

(Continued)

*Primary Examiner* — Michael C Miggins
(74) *Attorney, Agent, or Firm* — L & Cai Intellectual Property (USA) Office

(57) ABSTRACT

A polyester film and a method for producing the same are provided. The polyester film includes a heat resistant layer. The heat resistant layer includes a high temperature resistant resin material and a polyester resin material. The high temperature resistant resin material and the polyester resin material are melted and kneaded with each other via a twin screw granulator. The twin-screw granulator has a twin-screw temperature between 250° C. and 320° C., and the twin-screw granulator has a twin-screw rotation speed between 300 rpm and 800 rpm, so that the high temperature resistant resin material is dispersed in the polyester resin material with a particle size of between 50 nm and 200 nm.

8 Claims, 3 Drawing Sheets

(51) Int. Cl.
    *B29B 7/14*      (2006.01)
    *C08J 3/22*      (2006.01)
    *B32B 27/08*     (2006.01)
    *B32B 27/20*     (2006.01)
    *B32B 27/36*     (2006.01)
    *B29K 67/00*     (2006.01)

(52) U.S. Cl.
    CPC ... *B29K 2995/0041* (2013.01); *B32B 2250/02* (2013.01); *B32B 2250/03* (2013.01); *B32B 2307/306* (2013.01); *C08J 2367/00* (2013.01); *C08J 2471/00* (2013.01); *C08J 2479/08* (2013.01); *C08J 2481/06* (2013.01)

(56) References Cited

U.S. PATENT DOCUMENTS

2012/0217040 A1* 8/2012 Yoshida .................. B32B 27/30
                                                    174/137 A
2016/0326366 A1   11/2016 Sybert et al.

FOREIGN PATENT DOCUMENTS

| JP | 200553980 A   | 3/2005  |
| JP | 2009209351 A  | 9/2009  |
| JP | 201168807 A   | 4/2011  |
| JP | 2011183714 A  | 9/2011  |
| JP | 2011256254 A  | 12/2011 |
| JP | 2012102251 A  | 5/2012  |
| TW | 201223996 A1  | 6/2012  |
| TW | 201627347 A   | 8/2016  |

\* cited by examiner

US 11,707,876 B2

POLYESTER FILM AND METHOD FOR PRODUCING THE SAME

CROSS-REFERENCE TO RELATED PATENT APPLICATION

This application claims the benefit of priority to Taiwan Patent Application No. 108129565, filed on Aug. 20, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a polyester film, and more particularly to a transparent polyester film resistant to high temperatures and bending.

BACKGROUND OF THE DISCLOSURE

Polyester film is a polymer plastic film Due to the excellent overall performance of the polyester film, the polyester film is more and more popular with consumers. However, the performance of the conventional polyester film in some physical and chemical characteristics, such as high temperature resistance and bending resistance, are still not good, so that the conventional polyester film cannot be used in some special applications, such as protective films for foldable mobile phones.

For example, Taiwan Patent Application No. 104137871 discloses a bi-axially oriented polyester film. The polyester film was blended with PET and PEN to obtain a crystallization parameter (Tcg) that roughly fell between 40 and 80° C. The polyester film has excellent heat resistance and humidity resistance, but the glass transition temperature (Tg) of the polyester film is only about 80° C. Therefore, the polyester film is still limited in some applications requiring high temperature resistance.

China Patent Application No. 99118718.0 discloses a polyester film blended with PET and PEI. Although the glass transition temperature (Tg) of the polyester film can be raised to about 139° C., the PEI addition amount of the polyester film needs to be more than 40 wt %, which will cause uneven thickness (about 11%) due to the large difference of the expansion coefficient between PET and PEI. Moreover, this patent does not mention the heat resistance of the polyester film when it is used at a high temperature of about 230° C.

China Patent Application No. 201080031380.5 discloses a polyester film obtained by blending PET with high temperature resistant resins such as PSU, PEEK, and PAI to obtain a film with stable dimensional stability. However, this patent does not mention the heat resistance, glass transition temperature, and transparency of the film after blending.

SUMMARY OF THE DISCLOSURE

In response to the above-referenced technical inadequacies, the present disclosure provides a polyester film and a method for producing the same.

In one aspect, the present disclosure provides a method for producing a polyester film which includes: implementing a resin alloy master batch preparation step, including: melting and kneading a high temperature resistant resin material and a polyester resin material with a twin-screw granulator, and then forming a plurality of resin alloy master batches; wherein in the resin alloy master batch preparation step, a twin-screw temperature of the twin-screw granulator is between 250° C. and 320° C., and a twin-screw rotation speed of the twin-screw granulator is between 300 rpm and 800 rpm, so that in the plurality of resin alloy master batches, the high temperature resistant resin material is capable of being dispersed in the polyester resin material with an average particle size ranging from 50 nm to 200 nm; and implementing a film forming step, including: melting and extruding the plurality of resin alloy master batches with a film extruder to form a polyester film; wherein the polyester film includes a heat resistant layer, and the heat resistant layer is formed of the plurality of resin alloy master batches so that the heat resistant layer includes the high temperature resistant resin material and the polyester resin material.

In one aspect, the present disclosure provides a polyester film, which includes a heat resistant layer. The heat resistant layer includes a high temperature resistant resin material and a polyester resin material, and the high temperature resistant resin material is dispersed in the polyester resin material with an average particle size ranging from 50 nm to 200 nm; in which a content range of the high temperature resistant resin material in the heat resistant layer is between 10 wt % and 80 wt %.

Therefore, the method for producing the polyester film enables the finally produced polyester film to have good high temperature resistance and bending resistance characteristics without sacrificing transparency through the technical features of "the high temperature resistant resin material is dispersed in the polyester resin material with an average particle size ranging from 50 nm to 200 nm" and "in the resin alloy master batch preparation step, a twin-screw temperature of the twin-screw granulator is between 250° C. and 320° C., and a twin-screw rotation speed of the twin-screw granulator is between 300 rpm and 800 rpm, so that the high temperature resistant resin material is capable of being dispersed in the polyester resin material with an average particle size ranging from 50 nm to 200 nm". Therefore, the polyester film is particularly suitable for being applied to a protective film for a foldable mobile phone, or a protective film for a high temperature process of a printed circuit board.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
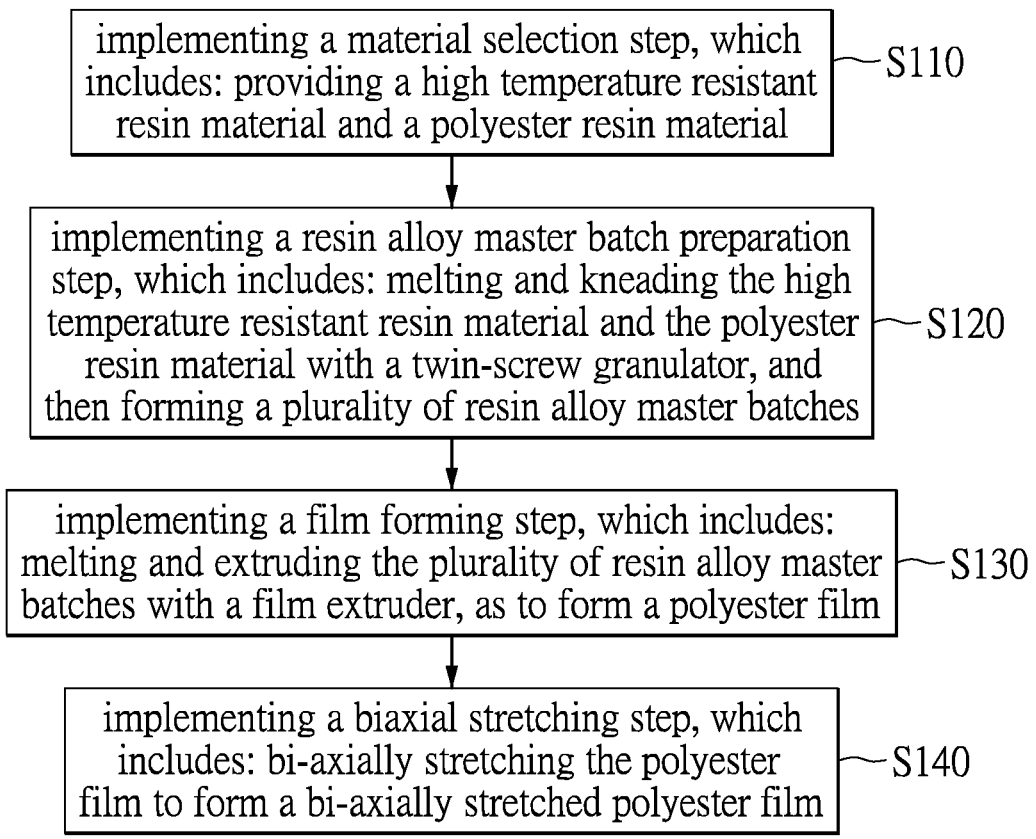
FIG. 1 is a flowchart showing a method for producing a polyester film according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Method for Producing Polyester Film

Figure 2:
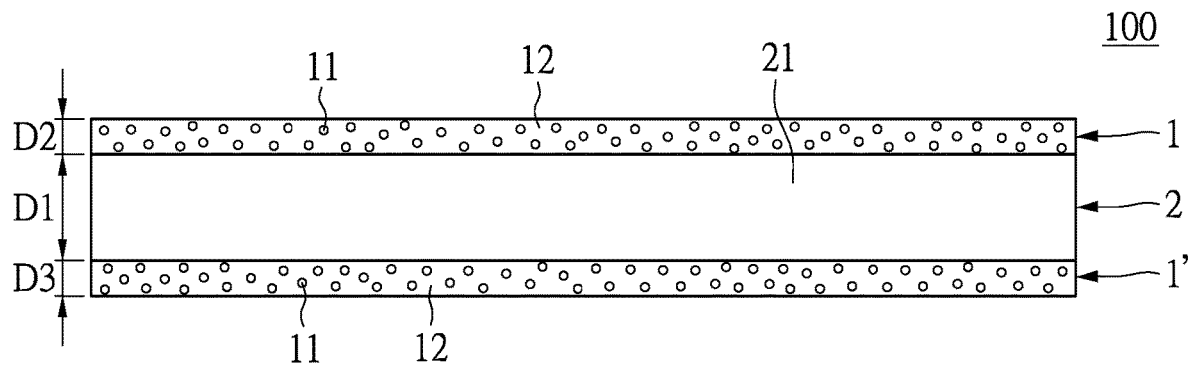
FIG. 2 is a schematic view showing a polyester film according to the embodiment of the present disclosure.

Referring to FIG. 1 and FIG. 2, the present embodiment discloses a method for producing a polyester film. The method for producing the polyester film includes steps of S110, S120, S130, and S140. It should be noted that the order of the steps and the actual manner of operation in the present embodiment can be adjusted according to requirements, and are not limited to those in the present embodiment.

Step S110 is implementing a material selection step. The material selection step includes: providing a high temperature resistant resin material 11 and a polyester resin material 12.

In order to enable the finally produced polyester film 100 to have high temperature resistance and bending resistance characteristics, the high temperature resistant resin material 11 is at least one material selected from the group consisting of poly-ether-imide (PEI), poly-sulfone (PSU), liquid-crystal-polymer (LCP), poly-ether-ether-keton (PEEK), and poly-amide-imide (PAI).

In the above-mentioned high temperature resistant resin material 11, the poly-ether-imide (PEI) is an amorphous resin material and has a glass transition temperature of approximately 215° C. The poly-sulfone (PSU) is an amorphous resin material, and has a glass transition temperature of approximately 185° C. and a melting point of approximately 280° C. The liquid-crystal-polymer (LCP) is a crystalline resin material and has a heat distortion temperature approximately between 180° C. and 260° C. The poly-ether-ether-keton (PEEK) is a semi-crystalline resin material and has a glass transition temperature of approximately 340° C. The poly-amide-imide (PAI) is a non-crystalline resin material and has a glass transition temperature approximately between 280° C. and 290° C.

That is, the above-mentioned high temperature resistant resin material 11 may be, for example, a crystalline resin material, a semi-crystalline resin material, or an amorphous resin material, and the high temperature resistant resin material may have a glass transition temperature, a melting point, or a heat distortion temperature between 180° C. and 400° C.

Moreover, the polyester resin material 12 is a polymer obtained by a condensation polymerization reaction of a diacid and a diol or a derivative thereof. Preferably, the polyester resin material 12 is polyethylene terephthalate (PET) or polyethylene naphthalate (PEN), but the present disclosure is not limited thereto.

It is worth mentioning that the diacid that forms the polyester resin material 12 is at least one material selected from the group consisting of tere-phthalic acid, iso-phthalic acid, 1,5-naphthalene-dicarboxylic acid, 2,6-naphthalene-dicarboxylic acid, 2,6-naphthalene-dicarboxylic acid, 1,4-naphthalene-dicarboxylic acid, bibenzoic acid, diphenyl-ethane-dicarboxylic acid, diphenyl-phosphonium dicarboxylic acid, anthracene-2,6-dicarboxylic acid, 1,3-cyclo-pentane-dicarboxylic acid, 1,3-cyclohexane-dicarboxylic acid, 1,4-cyclohexane-dicarboxylic acid, malonic acid, dimethyl-malonic acid, succinic acid, diethyl 3,3-succinic acid, glutaric acid, 2,2-among dimethyl glutaric acid, adipic acid, 2-methyl adipic acid, trimethyl adipic acid, pimelic acid, azelaic acid, sebacic acid, suberic acid, and dodecane-dioic acid. In addition, the diol that forms the polyester resin material 12 is at least one material selected from the group consisting of ethylene glycol, propylene glycol, hexamethylene glycol, neopentyl glycol, 1,2-cyclohexane-dimethanol, 1,4-cyclohexane-dimethanol, 1,10-decanediol, 1,3-propanediol, 1,4-butanediol, 1,5-pentanediol, 1,6-hexanediol, and 2,2-bis (4-hydroxyphenyl) propane, and bis (4-hydroxyphenyl) fluorene.

Step S120 is implementing a resin alloy master batch preparation step. The resin alloy master batch preparation step includes: melting and kneading the high temperature resistant resin material 11 and the polyester resin material 12 with a twin-screw granulator according to a predetermined weight ratio range, and then forming a plurality of resin alloy master batches.

Further, in the resin alloy master batch preparation step, a content range of the high temperature resistant resin material 11 is preferably between 10 parts by weight and 90 parts by weight, and a content range of the polyester resin material 12 is preferably between 10 parts by weight and 90 parts by weight. In addition, the content range of the high temperature resistant resin material 11 is more preferably between 5 parts by weight and 60 parts by weight, and the content range of the polyester resin material 12 is more preferably between 40 parts by weight and 95 parts by weight. The sum of the contents of all the above components is 100 parts by weight.

Moreover, in order to enable the finally produced polyester film 100 to have high temperature resistance and bending resistance characteristics, in the present embodiment, the high temperature resistant resin material 11 is dispersed in the polyester resin material 12 in a nanometer size.

In order to achieve the above purpose, in the resin alloy master batch preparation step, a twin-screw temperature of the twin-screw granulator is between 250° C. and 320° C., and preferably between 280° C. and 300° C. Further, a twin-screw rotation speed of the twin-screw granulator is between 300 rpm and 800 rpm, and preferably between 400 rpm and 600 rpm. Accordingly, in the plurality of resin alloy master batches, the high temperature resistant resin material 11 is capable of being dispersed in the polyester resin material 12 with an average particle size ranging from 50 nm to 200 nm.

That is, the high temperature resistant resin material 11 is dispersed in the polyester resin material 12 in a nanometer size mainly through the above-mentioned process conditions, such as the twin-screw temperature and the twin-screw rotation speed. Therefore, the high temperature resistant resin material 11 cannot only exert its material characteristics in the polyester film 100, but can also enable the polyester film 100 to maintain its required transparency. In addition, it is worth mentioning that in order to increase the compatibility between the high temperature resistant resin material 11 (i.e., PEI, PSU, LCP, PEEK, PAI) and the polyester resin material 12 (i.e., PET, PEN), the resin alloy master batch preparation step (S120) of the present embodiment may further include mixing a compatibilizer into the above-mentioned high temperature resistant resin material 11 and polyester resin material 12, and then melting and kneading the compatibilizer together with these resin materials 11, 12. The compatibilizer may be, for example, at least one of a polycarbonate and a polyphenylene ether, and an amount of the compatibilizer used in the resin alloy master batch is between 0.01 part by weight and 1 part by weight.

Step S130 is implementing a film forming step. The film forming step includes: melting and extruding the plurality of resin alloy master batches with a film extruder, so that the plurality of resin alloy master batches are formed into a heat resistant layer 1 as shown in FIG. 2. Since the heat resistant layer 1 is formed of the plurality of resin alloy master batches, the heat resistant layer 1 includes the high temperature resistant resin material 11 and the polyester resin material 12. The high temperature resistant resin material 11 is dispersed in the polyester resin material 12 in the form of a plurality of micro particles. The particle size of the heat resistant resin material 11 in the heat resistant layer 1 is between 50 nm and 200 nm.

In an embodiment of the present disclosure, the plurality of resin alloy master batches are preferably melted and extruded with the film extruder to form the heat resistant layer 1 at an operating temperature ranging from 280° C. to 300° C.

In addition, it is worth mentioning that the heat resistant layer 1 of the present embodiment is formed by directly melting and extruding the plurality of resin alloy master batches, but the present disclosure is not limited thereto. For example, if the content of the high temperature resistant resin material 11 in the resin alloy master batches is low (i.e., less than 40 wt %), the resin alloy master batches can be directly melt-extruded as in the above embodiment to form the heat resistant layer 1.

However, if the content of the high temperature resistant resin material 11 in the resin alloy master batches is high (i.e., greater than 50 wt %), the resin alloy master batches need to be melted and extruded together with an additional polyester resin material 12 to form the heat resistant layer 1, thereby reducing the content of the high temperature resistant resin material 11 in the heat resistant layer 1. Accordingly, the high temperature resistant resin material 11 may have an appropriate content range in the heat resistant layer 1, so that the finally produced polyester film 100 can have good high temperature resistance and bending resistance characteristics without sacrificing transparency.

In order to achieve the above purpose, in an embodiment of the present disclosure, a content range of the high temperature resistant resin material 11 in the heat resistant layer 1 is preferably between 10 wt % and 80 wt %, and more preferably between 15 wt % and 70 wt %. Further, a content range of the polyester resin material 12 in the heat resistant layer 1 is preferably between 20 wt % and 90 wt %, and more preferably between 30 wt % and 85 wt %.

More specifically, in the present embodiment, the film forming step S130 includes: co-extruding the plurality of resin alloy master batches with another polyester resin material 21 (i.e., PET, PEN) by the film extruder through a co-extrusion technology, so that two heat resistant layers 1, 1' and one polyester resin base layer 2 are formed at the same time. Further, the two heat resistant layers 1, 1' are respectively formed on two opposite surfaces of the polyester resin base layer 2, so that the polyester resin base layer 2 is sandwiched between the two heat resistant layers 1, 1'.

Figure 3:
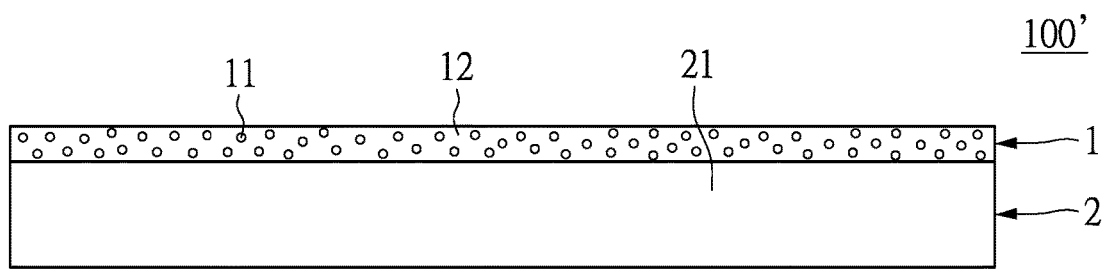
FIG. 3 is a schematic view showing a polyester film according to an alternative embodiment (a) of the present disclosure.
Figure 5:
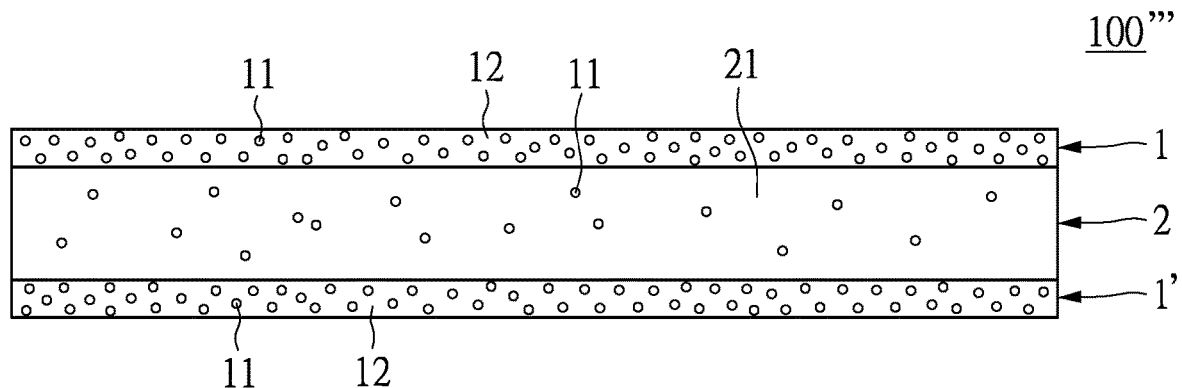
FIG. 5 is a schematic view showing a polyester film according to an alternative embodiment (c) of the present disclosure.
Figure 6:
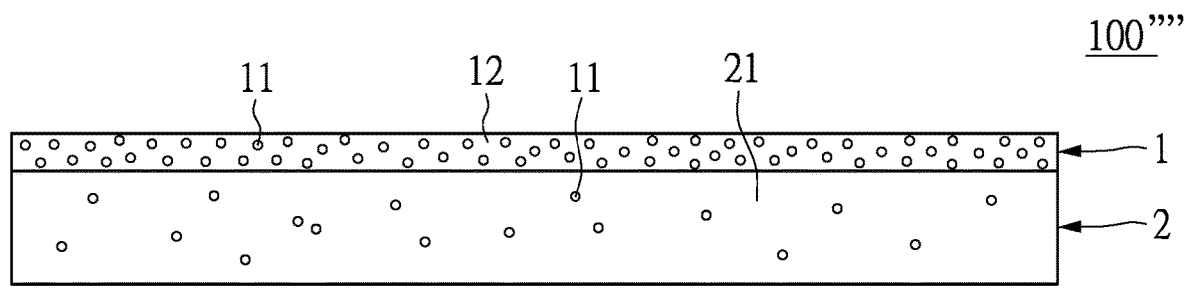
FIG. 6 is a schematic view showing a polyester film according to an alternative embodiment (d) of the present disclosure.

The two heat resistant layers 1, 1' are respectively formed of the plurality of resin alloy master batches. The polyester resin base layer 2 can be simply formed of another polyester resin material 21 as shown in FIG. 2 and FIG. 3, or can be formed of the plurality of resin alloy master batches as shown in FIG. 5 and FIG. 6.

The material types and content ranges of the high temperature resistant resin material 11 and the polyester resin material 12 of the two heat resistant layers 1, 1' may be completely the same or different. Further, the material types of the polyester resin materials of the two heat resistant layers 1, 1' and the polyester resin base layer 2 may be completely the same or different, the present disclosure is not limited thereto.

Referring to FIG. 2, according to the above-mentioned method for producing the polyester film, the finally produced polyester film 100 in the present embodiment has a three-layer structure in which a heat resistant layer 1, a polyester resin base layer 2, and another heat resistant layer 1' are sequentially stacked from top to bottom.

In addition, after the polyester film 100 is extruded by the film extruder, the polyester film 100 can be rapidly cooled through a cooling drum (e.g., a drum cooled to 15° C. to 50° C.), but the present disclosure is not limited thereto.

Step S140 is implementing a biaxial stretching step. The biaxial stretching step includes: bi-axially stretching the above-mentioned polyester film 100 having the three-layer structure to form a bi-axially stretched polyester film 100.

The above-mentioned biaxial stretching method may be, for example, a vertical uniaxial stretching method, a horizontal uniaxial stretching method, a vertical axis sequential biaxial stretching method, or a vertical axis simultaneous biaxial stretching method, and the present disclosure is not limited thereto. In addition, the above-mentioned biaxial stretching method may be, for example, pre-heating the un-stretched polyester film 100 at a stretching temperature of 50° C. to 150° C.; applying a stretching process of 2.0 times to 5.0 times (preferably 3.0 times to 4.5 times) in a width direction MD of the un-stretched polyester film 100; and further applying a stretching process of 2.0 times to 5.0 times (preferably 3.0 times to 4.5 times) in a longitudinal direction TD of the un-stretched polyester film 100 according to different stretching ratios.

Polyester Film

Referring to FIG. 2, the present embodiment also discloses a polyester film 100. The polyester film 100 may be produced by the above-mentioned method for producing the polyester film, but the present disclosure is not limited thereto.

More specifically, the polyester film 100 includes a polyester resin base layer 2 and two heat resistant layers 1, 1'. The material of the polyester resin base layer 2 is mainly a polyester resin material 21 as shown in FIG. 2 and FIG. 3, but the polyester resin base layer 2 may also be optionally mixed with a high temperature resistant resin material 11 as shown in FIG. 5 and FIG. 6. The two heat resistant layers 1, 1' are respectively formed on two opposite surfaces of the polyester resin base layer 2, so that the polyester resin base layer 2 is sandwiched between the two heat resistant layers 1, 1'. The two heat resistant layers 1, 1' each include a high temperature resistant resin material 11 and a polyester resin material 12. The high temperature resistant resin material 11 is dispersed in the polyester resin material 12 with a particle size ranging from 50 nm to 200 nm. Further, a content range of the high temperature resistant resin material 11 in the heat resistant layer 1, 1' is between 10 wt % and 80 wt %. It should be noted that, when the polyester resin base layer 2 is also mixed with the high temperature resistant resin material 11 (as shown in FIG. 5 and FIG. 6), the content range of the high temperature resistant resin material 11 in the polyester resin base layer 2 is between 5 wt % and 50 wt %, and the content range of the high temperature resistant resin material 11 in the heat resistant layer 1, 1' is between 5 wt % and 80 wt %.

Further referring to FIG. 2, in the present embodiment, in order to enable the polyester film 100 to have good high temperature resistance and bending resistance, while maintain good transparency, each layer of the polyester film 100 has a preferred thickness range. More specifically, the polyester resin base layer 2 has a thickness D1 between 15 μm and 350m, the heat resistant layer 1 has a thickness D2 between 0.5 μm and 70 μm, and the another heat resistant layer 1 has a thickness D3 between 0.5 μm and 70 μm.

In other words, the entire polyester film 100 has a thickness between 15 μm and 350 μm, and a thickness ratio range of the heat resistant layer 1, the polyester resin base layer 2, and the another heat resistant layer 1' is preferably between 1:98:1 and 20:60:20.

According to the above configuration, the polyester film 100 of the present embodiment has good high temperature resistance and bending resistance, and can maintain good transparency at the same time. Specifically speaking, the polyester film 100 of the present embodiment has a glass transition temperature between 110° C. and 150° C., a transparency of not less than 80%, and a haze of not more than 5%. Preferably, the glass transition temperature of the polyester film 100 is between 120° C. and 140° C., the transparency of the polyester film 100 is not less than 88%, and the haze of the polyester film 100 is not more than 3%.

In addition, the polyester film 100 of the present embodiment conforms to the following conditions.

(1) After the polyester film 100 is subjected to a hot pressing test or a heat resistance test, a warpage deformation amount of the polyester film 100 with an A4 size is not more than 3 mm, and the polyester film 100 is not cracked, which means a film surface of the polyester film 100 is intact without cracks.

The hot pressing test includes: placing the polyester film 100 in a temperature environment of 220° C. to 240° C.; and then applying a load of 40 kg to 50 kg to the polyester film 100 for 2.5 hours to 3.5 hours.

The heat resistance test includes: heating the polyester film 100 in a temperature environment of 220° C. to 240° C.; and then cooling the polyester film 100 in a room temperature environment. The above heating and cooling steps are repeated for five times.

(2) After the polyester film 100 is subjected to a bending resistance test, the polyester film 100 is not cracked. The bending resistance test includes: continuously bending the polyester film 100 from 25,000 to 30,000 times with a bending resistance tester.

It is worth mentioning that after the polyester film 100 of the present embodiment has undergone the above-mentioned hot pressing test or heat resistance test, a color difference ΔE (or chromatic aberration) of the polyester film 100 is not less than 2.

In terms of mechanical properties, the polyester film 100 of the present embodiment is tested according to ASTM D882. The test results show that a breaking strength of the film along the longitudinal direction (MD) is not less than 20 kgf/mm$^2$, a breaking strength of the film along the width direction (TD) is not less than 25 kgf/mm$^2$, an elongation of the film along the longitudinal direction (MD) is not less than 230%, and an elongation of the film along the width direction (TD) is not less than 160%.

The polyester film 100 of the present embodiment is tested according to ASTM D1204. The test results show that a shrinkage value of the film along the longitudinal direction (MD) under a room temperature is between 0.35% and 0.4%, and a shrinkage value of the film along the width direction (TD) under the room temperature is between 0.05% and 0.15%. Moreover, a shrinkage value of the film along the longitudinal direction (MD) under a temperature of 220° C. to 240° C. is not more than 2.5%, and a shrinkage value of the film along the width direction (TD) is not more than 4.5% under the temperature of 220° C. to 240° C.

Since the polyester film 100 of the present embodiment has good high temperature resistance and bending resistance, and has good transparency, the polyester film 100 of the present embodiment is particularly suitable for being applied to a protective film for a foldable mobile phone, or a protective film for a high temperature process of a printed circuit board.

It is worth mentioning that although the present embodiment is described by taking a polyester film 100 having a three-layer structure (including a polyester resin base layer 2 and two heat resistant layers 1, 1') as an example, the present disclosure is not limited thereto.

For example, as shown in FIG. 3, in an alternative embodiment of the present disclosure, the polyester film 100' may have a double-layer structure, which includes a polyester resin base layer 2 and a heat resistant layer 1 formed on one side surface of the polyester resin base layer 2.

Figure 4:
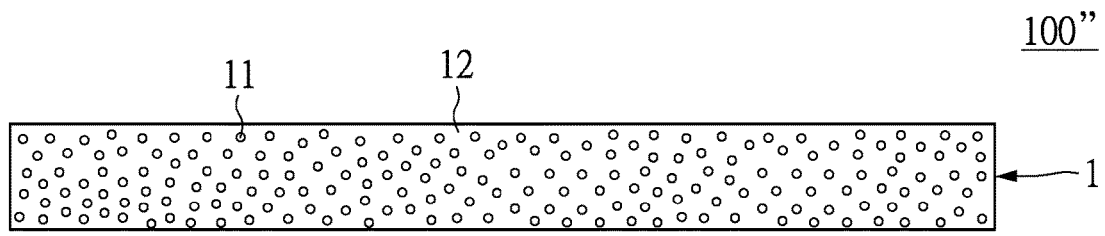
FIG. 4 is a schematic view showing a polyester film according to an alternative embodiment (b) of the present disclosure.

As shown in FIG. 4, in another alternative embodiment of the present disclosure, the polyester film 100" may have a single-layer structure. That is, the polyester film 100″ includes only one heat resistant layer 1, and the heat resistant layer 1 has a thickness between 15 μm and 350 μm. Therefore, the polyester film 100″ having the single-layer structure can still have good high temperature resistance and bending resistance while maintaining a certain degree of transparency.

In addition, a polyester film 100‴ having a three-layer structure is illustrated in FIG. 5, and a polyester film 100″″ having a double-layer structure is illustrated in FIG. 6. In these embodiments, the polyester resin base layer 2 may be mixed with a high temperature resistant resin material 11. The content range of the high temperature resistant resin material 11 in the polyester resin base layer 2 range from 5 wt % to 50 wt %. The content range of the high temperature resistant resin material 11 in the heat resistant layer 1, 1' ranges from 5 wt % to 80 wt %, which is higher than that of the polyester resin base layer 2.

Experimental Test Results

Hereinafter, the contents of the present disclosure will be described in detail with reference to exemplary examples 1 to 3 and comparative examples 1 to 3. However, the following examples are provided only to help understand the present disclosure, and the scope of the present disclosure is not limited to these examples.

Exemplary example 1 is that 50 parts by weight of a high temperature resistant resin material PEI (purchased from Sabic, product name UltemXH6050-1000) and 50 parts by weight of a polyester material PET (provided by Nan-Ya Plastics) are kneaded in a twin-screw granulator having a ratio of screw length to screw diameter of 48. Further, a twin-screw temperature of the twin-screw granulator is between 250° C. and 320° C., and a twin-screw rotation speed of the twin-screw granulator is between 300 rpm and 800 rpm, so as to obtain high temperature resistant resin alloy master batches with 50/50 mixed ratio of PEI-PET, and then the high temperature resistant resin alloy master batches are crystallized and dried under the conditions of 140° C. and 240 min.

The high temperature resistant resin alloy master batches and a polyester resin material are kneaded according to different ratios, and three layers of A/B/A layers are co-extruded. Layer A includes 30 wt % of PEI. Layer B includes 30 wt % of PEI. The thickness ratio of the A/B/A layers is 10/80/10. In the biaxial stretching step, a preheating temperature of the longitudinal axis extension is 95° C., a magnification of the longitudinal axis extension is 3.0, a preheating temperature of the horizontal axis extension is 120° C., a magnification of the horizontal axis extension is 4.5, and a heat setting temperature is 235° C., so that a transparent polyester film that is resistant to high temperature and bending is obtained.

In exemplary example 2, 50 parts by weight of a high temperature resistant resin material PSU (purchased from Solvay, product name P-3900) and 50 parts by weight of a polyester material PET (provided by Nan-Ya Plastics) are kneaded in a twin-screw granulator having a ratio of screw length to screw diameter of 48. Further, a twin-screw temperature of the twin-screw granulator is between 250° C. and 320° C., and a twin-screw rotation speed of the twin-screw granulator is between 300 rpm and 800 rpm, so as to obtain high temperature resistant resin alloy master batches with 50/50 mixed ratio of PSU-PET, and then the high temperature resistant resin alloy master batches are crystallized and dried under the conditions of 140° C. and 240 min.

In exemplary example 3, 50 parts by weight of a high temperature resistant resin material PAI (purchased from Solvay, product name Toron 4000T) and 50 parts by weight of a polyester material PET (provided by Nan-Ya Plastics) are kneaded in a twin-screw granulator having a ratio of screw length to screw diameter of 48. Further, a twin-screw temperature of the twin-screw granulator is between 250° C. and 320° C., and a twin-screw rotation speed of the twin-screw granulator is between 300 rpm and 800 rpm, so as to obtain high temperature resistant resin alloy master batches with 50/50 mixed ratio of PAI-PET, and then the high temperature resistant resin alloy master batches are crystallized and dried under the conditions of 140° C. and 240 min. The preparation conditions of the biaxial extension of the exemplary examples 2 and 3 are the same as those of the exemplary example 1, and will not be reiterated herein.

Comparative example 1: the preparation method of the polyester film is the same as that of the exemplary example 1, except that the twin-screw rotation speed of the comparative example 1 is 200 rpm.

Comparative example 2: the preparation method of the polyester film is the same as that of the exemplary example 1, the difference being that in the A/B/A layer of the comparative example 2, the PEI content of the A layer is 5 wt % and the PEI content of the B layer is also 5 wt %.

Comparative example 3: the preparation method of the polyester film is the same as that of the exemplary example 1, the difference being that the overall thickness of the A/B/A layer of the comparative example 3 is thinner than that of the exemplary example 1 (not more than 15 μm).

The process parameters of the exemplary and comparative examples are summarized in Table 1 below.

The polyester films prepared in the exemplary examples 1 to 3 and the comparative examples 1 to 3 were tested to obtain the physical and chemical characteristics of the polyester films, such as: glass transition temperature (° C.), transparency (%), and haze value (%). The relevant test methods are described below, and the relevant test results are summarized in Table 1.

Glass transition temperature test: a differential scanning calorimeter (DSC) TA Q20 was used to measure the enthalpy of primary melting of the polyester film.

Transparency and Haze Test: a Haze Meter (model TC-HIII) of Tokyo Den Sho Ku Company was used to test the transparency (or light transmittance) and haze value of the polyester film. The test method complies with MS K7705.

Warpage deformation amount test includes: placing the polyester film with an A4-size at 220° C. for 1 hour and 10 cycles, and observing the warpage deformation amount (mm) of the film.

Film cracking test (heat resistance test): the polyester film was subjected to a hot pressing test at 220° C. for 45 kg and 3 hours. Evaluation index: if the film surface was flat and not deteriorated, the surface quality of the film was evaluated as ⊚. If the film surface was cracked or deteriorated, the surface quality of the film was evaluated as x.

[Table 1 shows the process conditions and physical and chemical characteristics of the exemplary and comparative examples]

| | item | exemplary example 1 | exemplary example 2 | exemplary example 3 | comparative example 1 | comparative example 2 | comparative example 3 |
|---|---|---|---|---|---|---|---|
| master batch preparation conditions | twin-screw temperature (° C.) | 300 | 300 | 300 | 200 | 300 | 300 |
| | twin-screw rotation speed (rpm) | 500 | 500 | 500 | 500 | 500 | 500 |
| | particle size of high temperature resistant resin material (nm) | 50 | 68 | 79 | 532 | 65 | 79 |
| | type of high temperature resistant resin material | PEI | PSU | PAI | PEI | PSU | PAI |
| layer thickness | upper heat resistant layer thickness (μm) | 2.5 | 2.5 | 2.5 | 2.5 | 2.5 | 1 |
| | polyester base layer thickness (μm) | 45 | 45 | 45 | 45 | 45 | 10 |
| | lower heat resistant layer thickness (μm) | 2.5 | 2.5 | 2.5 | 2.5 | 2.5 | 1 |
| film | glass transition temperature (° C.) | 245 | 230 | 220 | 220 | 150 | 220 |
| | transparency (%) | 90 | 89 | 88 | 80 | 89 | 88 |
| | haze (%) | 1.5 | 1.8 | 2.0 | 8.4 | 1.2 | 2.0 |
| | warpage deformation amount (mm) | 1.3 | 1.8 | 2.1 | 4.3 | 15.8 | 2.3 |
| | film cracking test (heat resistance test) | ◉ | ◉ | ◉ | ◉ | X | X |

Test Results and Discussion

In the exemplary examples 1 to 3, the physical and chemical characteristics of the polyester films have reached the design requirements of the product. In the comparative example 1, since the twin-screw rotation speed was too low, the high temperature resistant resin material could not be uniformly dispersed in the polyester resin material. In the comparative example 2, the addition amount of the high temperature resistant resin material is too small, resulting in insufficient heat resistance of the entire polyester film, and a high amount of warpage deformation after baking. In the comparative example 3, the overall film thickness was too thin, resulting in a poor effect of the film deterioration test.

Beneficial Effects of the Embodiment

In conclusion, the method for producing the polyester film of the present embodiment enables the finally produced polyester film 100 to have high temperature resistance and bending resistance characteristics without sacrificing transparency through the technical features of "the high temperature resistant resin material 11 is dispersed in the polyester resin material 12 with an average particle size ranging from 50 nm to 200 nm" and "in the resin alloy master batch preparation step, a twin-screw temperature of the twin-screw granulator is between 250° C. and 320° C., and a twin-screw rotation speed of the twin-screw granulator is between 300 rpm and 800 rpm, so that the high temperature resistant resin material 11 is capable of being dispersed in the polyester resin material 12 with an average particle size ranging from 50 nm to 200 nm". Therefore, the polyester film 100 is particularly suitable for being applied to a protective film for a foldable mobile phone, or a protective film for a high temperature process of a printed circuit board.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A polyester film, comprising:
    a heat resistant layer including a high temperature resistant resin material and a polyester resin material, and the high temperature resistant resin material is dispersed in the polyester resin material with an average particle size ranging from 50 nm to 200 nm; wherein a content range of the high temperature resistant resin material in the heat resistant layer is between 15 wt % and 70 wt %, a content range of the polyester resin material in the heat resistant layer is between 30 wt % and 85 wt %, the high temperature resistant resin material is at least one material selected from the group consisting of liquid-crystal-polymer (LCP), poly-ether-ether-keton (PEEK), and poly-amide-imide (PAI), and the polyester resin material is polyethylene terephthalate (PET) or polyethylene naphthalate (PEN);
    wherein the high temperature resistant resin material is a crystalline resin material or a semi-crystalline resin material, and the high temperature resistant resin material has a glass transition temperature between 220° C. and 245° C., a transparency between 88% and 90%, and a haze between 1.5% to 2%.

2. The polyester film according to claim 1, wherein the high temperature resistant resin material is melted and kneaded with the polyester resin material by a twin-screw granulator; wherein a twin-screw temperature of the twin-screw granulator is between 250° C. and 320° C., and a twin-screw rotation speed of the twin-screw granulator is between 300 rpm and 800 rpm, so that the high temperature resistant resin material is dispersed in the polyester resin material with the average particle size ranging from 50 nm to 200 nm.

3. The polyester film according to claim 1, wherein the polyester film is a single-layer film structure including only one heat resistant layer, and the heat resistant layer has a thickness between 15 μm and 350 μm.

4. The polyester film according to claim 1, further comprising: a compatibilizer mixed into the high temperature resistant resin material and the polyester resin material, and the compatibilizer is at least one of a polycarbonate and a polyphenylene ether.

5. The polyester film according to claim 1, further comprising: a polyester resin base layer, and the heat resistant layer being formed on a side surface of the polyester resin base layer.

6. The polyester film according to claim 5, further comprising another heat resistant layer; wherein the another heat resistant layer is formed on another side surface of the polyester resin base layer, so that the polyester resin base layer is sandwiched between the heat resistant layer and the another heat resistant layer; wherein the another heat resistant layer also includes the high temperature resistant resin material and the polyester resin material; wherein the polyester resin base layer has a thickness between 15 μm and 350 μm, the heat resistant layer has a thickness between 0.5 μm and 70 μm, and the another heat resistant layer has a thickness between 0.5 μm and 70 μm.

7. The polyester film according to claim 6, wherein the polyester film has a glass transition temperature between 110° C. and 150° C., a transparency of not less than 80%, and a haze of not more than 5%.

8. The polyester film according to claim 6, wherein the polyester film conforms to the following conditions:
(1) after the polyester film is subjected to a hot pressing test or a heat resistance test, a warpage deformation amount of the polyester film is not more than 3 mm, and the polyester film is not cracked; wherein the hot pressing test includes: placing the polyester film in a temperature environment of 220° C. to 240° C.; and then applying a load of 40 kg to 50 kg to the polyester film for 2.5 hours to 3.5 hours; wherein the heat resistance test includes: heating the polyester film in a temperature environment of 220° C. to 240° C.; and then cooling the polyester film in a room temperature environment, and repeating the above heating and cooling steps for five times; and
(2) after the polyester film is subjected to a bending resistance test, the polyester film is not cracked; wherein the bending resistance test includes: continuously bending the polyester film from 25,000 to 30,000 times with a bending resistance tester.

* * * * *